United States Patent
Wu et al.

(10) Patent No.: US 7,295,105 B2
(45) Date of Patent: Nov. 13, 2007

(54) TURN INDICATOR UNIT FOR A RELAY-CONTROLLED FLASHER

(75) Inventors: Hsiang-Chen Wu, Tao-Yuan (TW); Ming-Shan Kuo, Kaohsiung Hsien (TW)

(73) Assignee: T.Y.C. Brother Industrial Co., Ltd., Tainan (TW)

( * ) Notice: Subject to any disclaimer, the term of this patent is extended or adjusted under 35 U.S.C. 154(b) by 81 days.

(21) Appl. No.: 11/079,191

(22) Filed: Mar. 15, 2005

(65) Prior Publication Data

US 2006/0220824 A1    Oct. 5, 2006

(51) Int. Cl.
*B60Q 1/34* (2006.01)
*G08B 21/00* (2006.01)
*H05B 37/00* (2006.01)

(52) U.S. Cl. ............... 340/475; 340/641; 340/331; 315/200 A; 315/209 R; 362/498

(58) Field of Classification Search .......... 340/475
See application file for complete search history.

(56) References Cited

U.S. PATENT DOCUMENTS 2,957,161 A * 10/1960 Daws .................. 340/475
2006/0038697 A1 * 2/2006 Wu et al. .............. 340/815.45

* cited by examiner

*Primary Examiner*—Donnie L. Crosland
(74) *Attorney, Agent, or Firm*—Pillsbury Winthrop Shaw Pittman, LLP

(57) ABSTRACT

A turn indicator unit includes a light source, a matching module, and a current interrupter. The light source is coupled across an output side of a flasher. The matching module is coupled across the light source. The current interrupter is coupled between the light source and the matching module so as to interrupt periodically current flow to the matching module when the light source is activated.

4 Claims, 4 Drawing Sheets

TURN INDICATOR UNIT FOR A RELAY-CONTROLLED FLASHER

BACKGROUND OF THE INVENTION

1. Field of the Invention

The invention relates to a turn indicator unit, more particularly to a turn indicator unit for a relay-controlled flasher.

2. Description of the Related Art

Referring to FIG. 1, a conventional turn indicator for indicating the direction in which a vehicle (not shown) is about to turn includes a pair of lamps 22, 23, each of which is connected across an output side 211, 212 of a relay-controlled automotive flasher 21.

In operation, when both lamps 22, 23 are operational, the load resistance across the output side 211, 212 of the automotive flasher 21 is equal to the equivalent resistances of the individual lamps 22, 23 in parallel. The automotive flasher 21 operates such that each of the lamps 22, 23 flashes in the 1 to 2 Hz frequency range. When the lamp 22 fails, the load resistance across the output side 211, 212 of the automotive flasher 21 is equal to the equivalent resistance of the lamp 23. In this case, the automotive flasher 21 operates such that the lamp 23 flashes in the 3 to 5 Hz frequency range, which serves as an indication for the vehicle owner to conduct replacement of the lamps 22.

When it is desired to replace the lamp 22 of the conventional turn indicator with a high resistance lamp (not shown), such as a light-emitting diode lamp, a resistor 24 is coupled across the light-emitting diode lamp. It is noted that, without the resistor 24, which serves as an impedance matching component, since the light-emitting diode lamp has a equivalent resistance that is relatively large when compared with that of the lamp 22, the automotive flasher 21 operates such that each of the lamp 23 and the light-emitting diode lamp does not flash in the required 1 to 2 Hz frequency range. The resistor 24, however, consumes a relatively large amount of power and introduces heat dissipation problems.

SUMMARY OF THE INVENTION

Therefore, the object of the present invention is to provide a turn indicator unit that can overcome the aforesaid drawback of the prior art.

According to the present invention, a turn indicator unit comprises a light source, a matching module, and a current interrupter. The light source is adapted to be coupled across an output side of a flasher. The matching module is coupled across the light source. The current interrupter is coupled between the light source and the matching module so as to interrupt periodically current flow to the matching module when the light source is activated.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
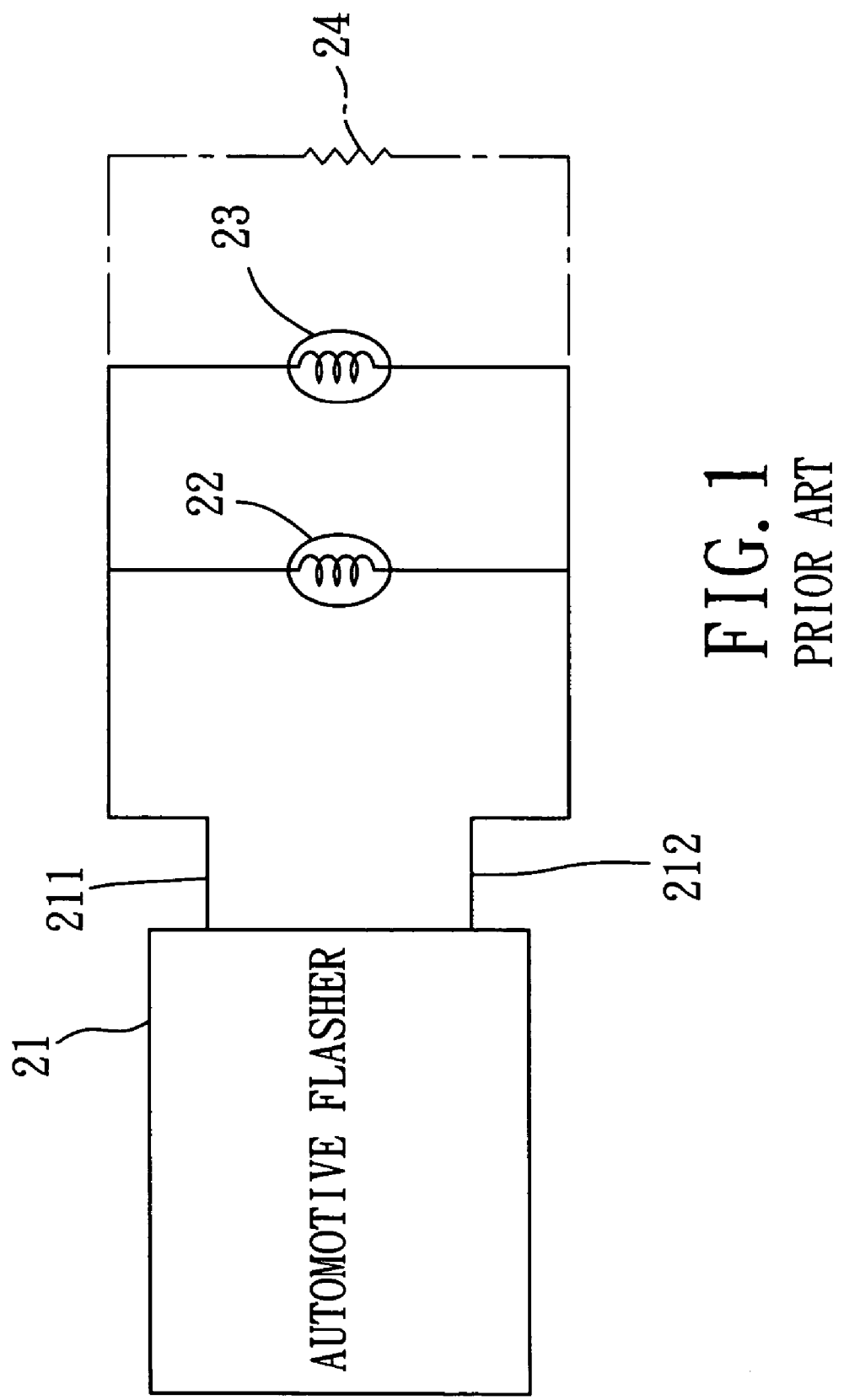
FIG. 1 is a schematic circuit block diagram of a conventional turn indicator unit.
Figure 2:
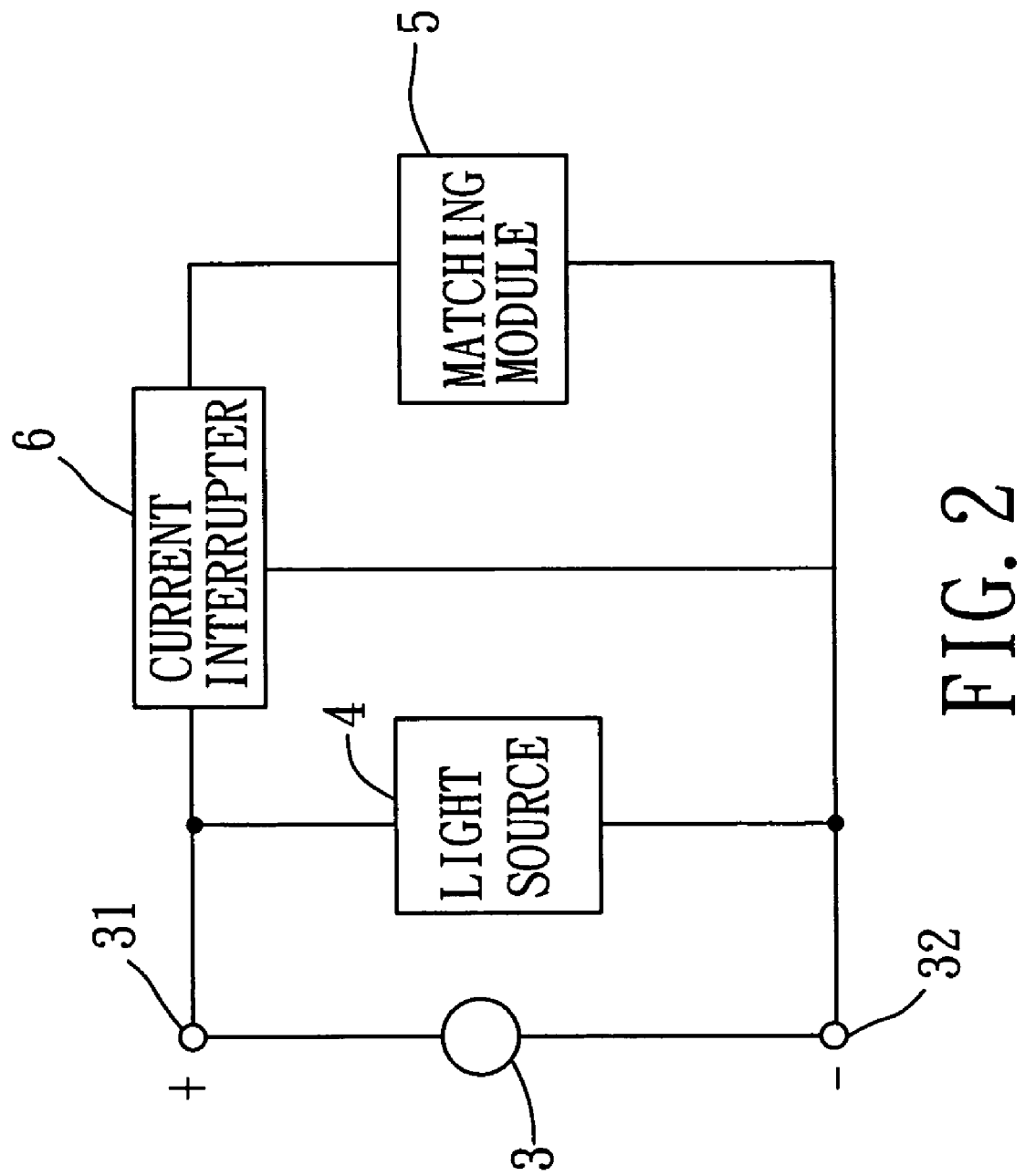
FIG. 2 is a schematic block diagram of the preferred embodiment of a turn indicator unit according to this invention.
Figure 3:
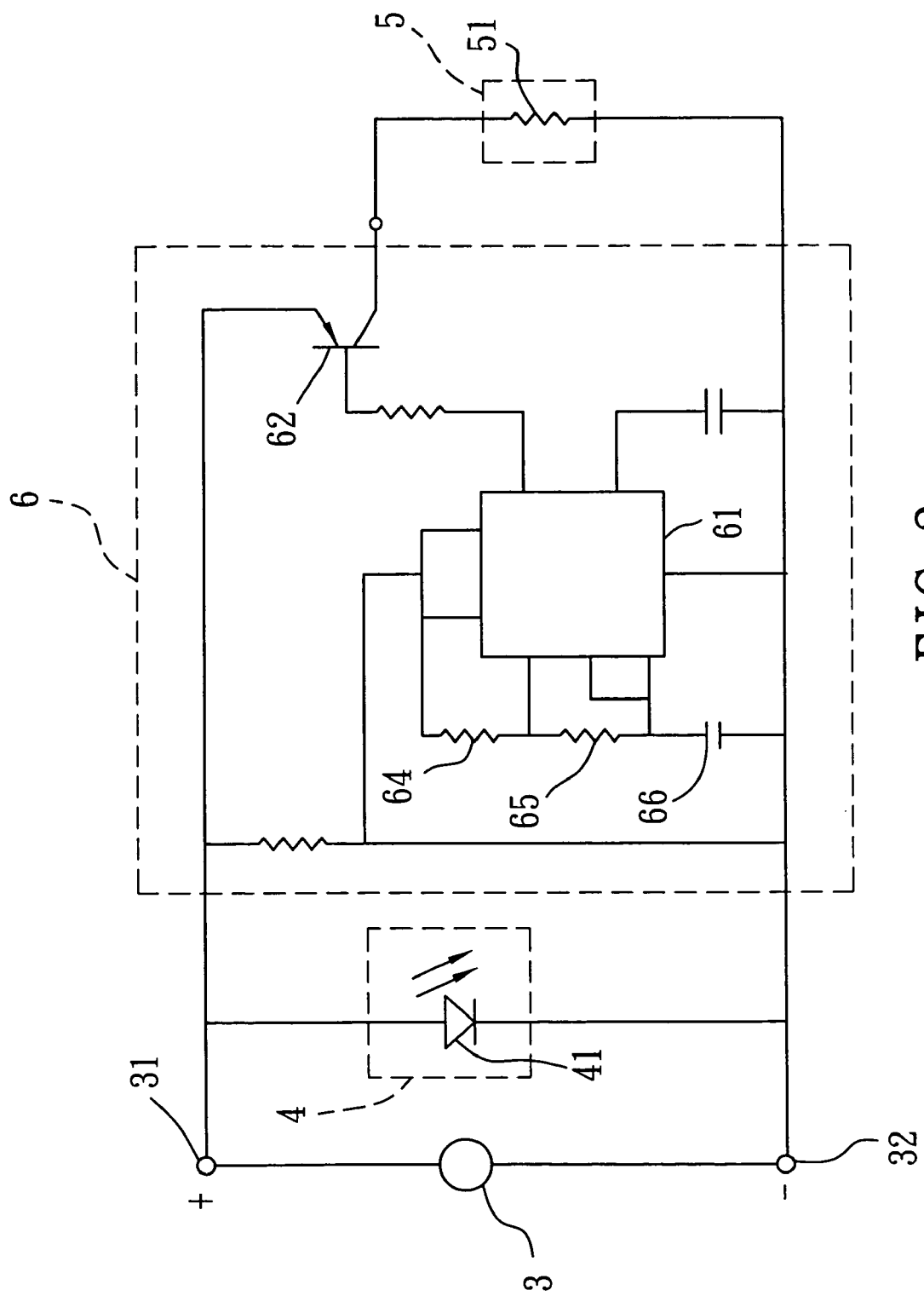
FIG. 3 is a schematic circuit diagram of the preferred embodiment.

Referring to FIGS. 2 and 3, the preferred embodiment of a turn indicator unit according to this invention is shown to include a light source 4, a matching module 5, and a current interrupter 6.

Figure 4A:
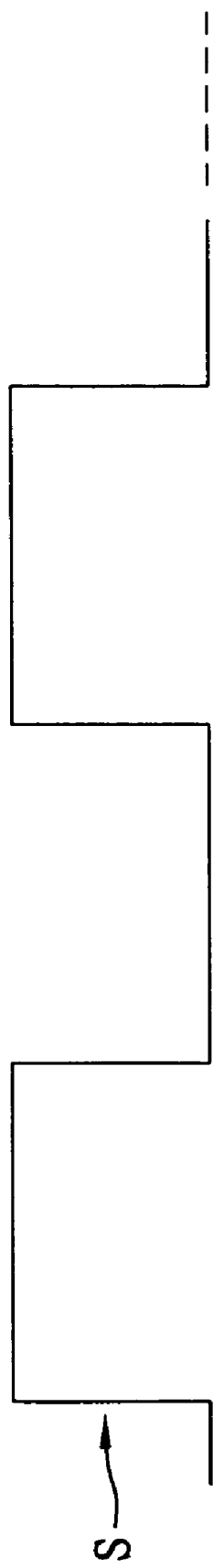
FIGS. 4 (A) and 4 (B) are time charts to illustrate the relation between an output signal (S) and a pulse train output (W).

The turn indicator unit in this embodiment is adapted for use with a flasher 3, such as a conventional relay-controlled automotive flasher. The flasher 3 has an output side 31, 32 that provides an output signal (S) (see FIG. 4A), which varies between high and low states.

The light source 4 includes a light-emitting diode 41 that is coupled across the output side 31, 32 of the flasher 3. It is noted that the light-emitting diode 41 of the light source 4 is activated and deactivated when the output signal (S) of the flasher 3 is in the high and low states, respectively.

Although the light source 4 is exemplified to include only a single light-emitting diode 41 in this embodiment, it should be apparent to those skilled in the art that the number of light-emitting diodes of the light source 4 may be increased to meet design requirements.

The matching module 5 includes a resistor 51 that is coupled across the light-emitting diode 41 of the light source 4, and that has a resistance substantially equal to that of a lamp conventionally used as a light source in a conventional turn indicator unit.

The current interrupter 6 includes a pulse train generator 61 and a switch 62. The pulse train generator 61, preferably a NE555 integrated circuit timer, is coupled in parallel between the light-emitting diode 41 of the light source 4 and the resistor 51 of the matching module 5. The switch 62, such as a transistor switch, is coupled in series between the light-emitting diode 41 of the light source 4 and the resistor 51 of the matching module 5, and is further coupled to and controlled by the pulse train generator 61, in a manner that will be described hereinafter.

The current interrupter 6 further includes a pair of resistors 64, 65, and a capacitor 66 that are coupled to the pulse train generator 61.

Figure 4B:
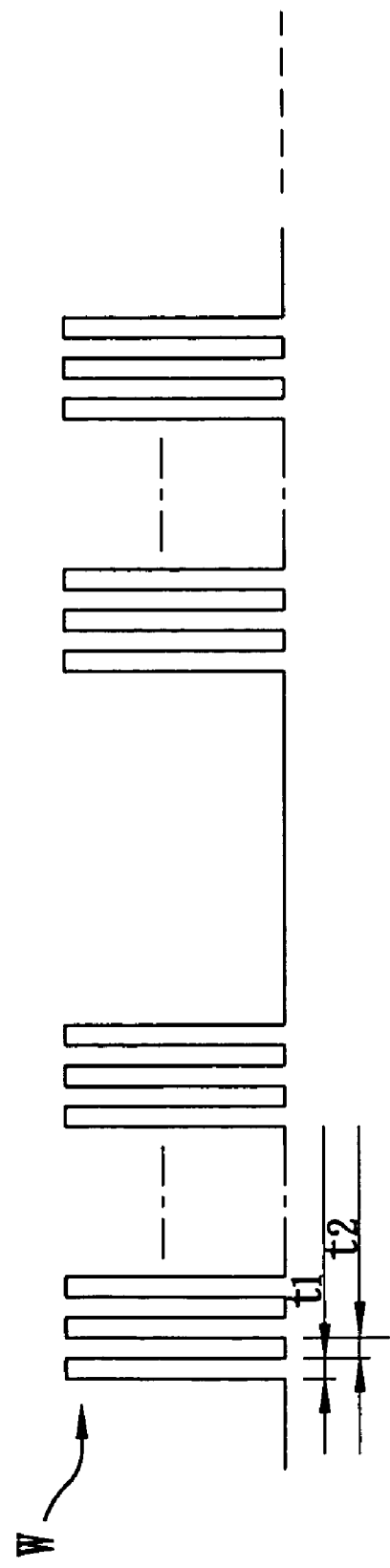

In operation, with further reference to FIGS. 4 (A) and 4(B), when the flasher 3 is activated, the output signal (S) of the flasher 3 is fed to the pulse train generator 61. The pulse train generator 61 generates a pulse train output (W) when the output signal (S) of the flasher is at the high state, i.e., the light-emitting diode 41 of the light source 4 is activated. This causes the switch 62 to turn on and off, thereby periodically interrupting current flow to the resistor 51 of the matching module 5 in accordance with the pulse train output (W) of the pulse train generator 61.

It is noted that the pulse train output (W) of the pulse train generator 61 is a series of square waves, and has a frequency higher than that of the output signal (S) of the flasher 3. The durations of transition states (t1, t2) of the pulse train output (W) of the pulse train generator 61 can be altered by scaling the resistors 64, 65 and the capacitor 66. In other words, the pulse train output (W) of the pulse train generator 61 may be configured at a desired duty cycle simply by choosing appropriate values for the resistors 64, 65 and the capacitor 66.

Based on experimental results, when the pulse train generator 61 is configured such that the pulse train output (W) has a frequency of 600 Hz and a duty cycle of 50%, the resistor 51 of the matching module 5 consumes 50% less power compared to the conventional turn indicator unit.

The flasher 3 further includes a pair of left and right turn signal lights (not shown) typically mounted on a dashboard (not shown) of an automobile (not shown). It is noted that the left (or right) turn signal light flashes at the same rate with light-emitting diode 41 of the light source 4.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A turn indicator unit comprising:
    a light source adapted to be coupled across an output side of a flasher;
    a matching module coupled across said light source; and
    a current interrupter coupled between said light source and said matching module so as to interrupt periodically current flow to said matching module when said light source is activated.

2. The turn indicator unit as claimed in claim 1, wherein said light source includes at least one light-emitting diode.

3. The turn indicator unit as claimed in claim 1, wherein said matching module includes a resistor.

4. The turn indicator unit as claimed in claim 1, wherein said current interrupter includes: a pulse train generator for generating a pulse train output when said light source is activated; and a switch coupled in series between said light source and said matching module and further coupled to and controlled by said pulse train generator for interrupting current flow to said matching module in accordance with the pulse train output of said pulse train generator.

* * * * *